US012566730B2

(12) United States Patent
Boshev

(10) Patent No.: US 12,566,730 B2
(45) Date of Patent: Mar. 3, 2026

(54) IN-MEMORY CACHE WITH AUTO-SIZING FOR FASTER FILE READING

(71) Applicant: SAP SE, Walldorf (DE)

(72) Inventor: Stoyan Zhivkov Boshev, Sofia (BG)

(73) Assignee: SAP SE, Walldorf (DE)

( * ) Notice: Subject to any disclaimer, the term of this patent is extended or adjusted under 35 U.S.C. 154(b) by 154 days.

(21) Appl. No.: 18/462,958

(22) Filed: Sep. 7, 2023

(65) Prior Publication Data

US 2025/0086142 A1 Mar. 13, 2025

(51) Int. Cl.
*G06F 16/172* (2019.01)
*G06F 16/16* (2019.01)

(52) U.S. Cl.
CPC .......... *G06F 16/172* (2019.01); *G06F 16/162* (2019.01)

(58) Field of Classification Search
CPC .............................. G06F 16/172; G06F 16/162
See application file for complete search history.

(56) References Cited

U.S. PATENT DOCUMENTS

| | | | | |
|---|---|---|---|---|
| 6,453,319 | B1 * | 9/2002 | Mattis | H04L 67/568 |
| | | | | 711/119 |
| 6,463,509 | B1 * | 10/2002 | Teoman | G06F 12/0866 |
| | | | | 711/E12.019 |
| 6,915,307 | B1 * | 7/2005 | Mattis | G06F 16/10 |
| | | | | 717/121 |
| 6,973,542 | B1 * | 12/2005 | Schmuck | G06F 16/10 |
| | | | | 711/137 |

| | | | | |
|---|---|---|---|---|
| 9,432,398 | B2 * | 8/2016 | Iliev | G06F 21/62 |
| 9,602,521 | B2 * | 3/2017 | Iliev | G06F 16/22 |
| 9,826,035 | B2 * | 11/2017 | Genevski | H04L 67/62 |
| 9,852,149 | B1 * | 12/2017 | Taylor | G06F 16/1844 |
| 10,146,516 | B2 * | 12/2018 | Ebcioglu | G06F 30/30 |
| 10,275,346 | B2 * | 4/2019 | Boshev | G06F 11/0793 |
| 10,528,624 | B2 * | 1/2020 | Boshev | H04L 1/00 |
| 10,541,042 | B2 * | 1/2020 | Nelson | G06F 11/3698 |
| 11,048,598 | B2 | 6/2021 | Neichev et al. | |
| 11,265,236 | B1 | 3/2022 | Yousouf et al. | |
| 11,494,240 | B2 | 11/2022 | Boshev | |
| 11,522,075 | B2 | 12/2022 | Boshev | |
| 11,522,975 | B2 * | 12/2022 | Boshev | G06F 16/273 |
| 11,558,452 | B2 | 1/2023 | Boshev et al. | |

(Continued)

OTHER PUBLICATIONS

U.S. Appl. No. 18/319,206, filed May 17, 2023, Boshev et al.
U.S. Appl. No. 18/320,705, filed May 19, 2023, Boshev et al.

*Primary Examiner* — Mark E Hershley
(74) *Attorney, Agent, or Firm* — Fish & Richardson P.C.

(57) ABSTRACT

The present disclosure relates to computer-implemented methods, software, and systems for managing an in-memory cache to support auto-sizing features and to support faster reading of files. A request to read a file from a file system of the file service is received by the in-memory cache. In response to the received request, a file entry for the file that is stored in the in-memory cache is determined. The file entry comprises a counter defining a number of times the file has been requested to be read. The counter is evaluated according to a cache storage rule. In response to the evaluation, the file is obtained by the in-memory cache file from the file system; and the file is stored in the in-memory cache to update the file entry. The file as obtained from the file system and provided by the in-memory cache.

20 Claims, 8 Drawing Sheets

(56)                    References Cited

U.S. PATENT DOCUMENTS

| | | | |
|---|---|---|---|
| 11,563,657 B2 | 1/2023 | Yousouf et al. | |
| 11,570,074 B2 | 1/2023 | Yousouf et al. | |
| 11,570,075 B2 | 1/2023 | Yousouf et al. | |
| 11,595,280 B2 | 2/2023 | Yousouf et al. | |
| 11,687,565 B2 | 6/2023 | Boshev et al. | |
| 11,693,828 B2 | 7/2023 | Boshev et al. | |
| 12,038,882 B2 * | 7/2024 | Jones | G06F 16/119 |
| 2007/0102764 A1 * | 5/2007 | Ando | H04N 21/4325 |
| | | | 348/E5.006 |
| 2007/0180466 A1 * | 8/2007 | Ando | H04N 21/42646 |
| | | | 348/E5.007 |
| 2007/0250552 A1 * | 10/2007 | Lango | G06F 3/0665 |
| | | | 709/225 |
| 2009/0037456 A1 * | 2/2009 | Kirshenbaum | G06F 16/137 |
| | | | 707/999.102 |
| 2009/0037500 A1 * | 2/2009 | Kirshenbaum | G06F 16/137 |
| 2010/0095164 A1 * | 4/2010 | Kamei | G06F 3/065 |
| | | | 714/48 |
| 2010/0333116 A1 * | 12/2010 | Prahlad | G06F 3/0605 |
| | | | 713/153 |
| 2011/0276623 A1 * | 11/2011 | Girbal | G06F 16/172 |
| | | | 709/219 |
| 2012/0272008 A1 * | 10/2012 | Tashiro | G06F 12/0866 |
| | | | 711/129 |
| 2013/0198460 A1 * | 8/2013 | Ochi | G06F 12/0891 |
| | | | 711/133 |
| 2014/0006354 A1 * | 1/2014 | Parkison | G06F 3/0635 |
| | | | 707/661 |
| 2015/0293699 A1 * | 10/2015 | Bromley | G06F 3/0649 |
| | | | 711/161 |
| 2016/0239432 A1 * | 8/2016 | Zhuang | G06F 12/023 |
| 2018/0060213 A1 * | 3/2018 | Mola | G06F 11/3636 |
| 2018/0329712 A1 * | 11/2018 | Palani | G06F 12/127 |
| 2019/0340103 A1 * | 11/2019 | Nelson | G06F 11/3636 |
| 2020/0043123 A1 * | 2/2020 | Dash | G06F 9/3851 |
| 2022/0100668 A1 * | 3/2022 | Blagodurov | G06F 12/0815 |
| 2022/0156100 A1 | 5/2022 | Boshev et al. | |
| 2022/0255821 A1 | 8/2022 | Yousouf et al. | |
| 2022/0269428 A1 * | 8/2022 | Gong | G06F 3/0673 |
| 2022/0300459 A1 | 9/2022 | Boshev et al. | |
| 2022/0385528 A1 | 12/2022 | Yousouf et al. | |
| 2022/0391495 A1 | 12/2022 | Boshev et al. | |
| 2023/0026659 A1 | 1/2023 | Boshev et al. | |
| 2023/0128279 A1 * | 4/2023 | Madan | G06F 11/1464 |
| | | | 707/654 |
| 2023/0269152 A1 | 8/2023 | Yousouf et al. | |
| 2023/0269153 A1 | 8/2023 | Yousouf et al. | |
| 2025/0086142 A1 * | 3/2025 | Boshev | G06F 16/172 |

* cited by examiner

IN-MEMORY CACHE WITH AUTO-SIZING FOR FASTER FILE READING

TECHNICAL FIELD

The present disclosure relates to computer-implemented methods, software, and systems for data processing.

BACKGROUND

Software complexity is increasing and causes changes to lifecycle management and maintenance of software applications and platform systems. Customer's needs are transforming, with increased requests for flexibility in terms of processes and landscapes, and also for high availability to access data resources. Applications and services store data in file storages, where stored data can be accessed in response to received reading and writing requests. The execution of such requests can be associated with performance requirements defined by the applications and/or services. However, accessing files from a file storage, from one or multiple entities, can be a resource heavy operation that can consume computational power and be associated with slow performance.

SUMMARY

The present disclosure involves systems, software, and computer implemented methods for managing an in-memory cache to maintain files thus to support faster reading of files.

One example method for managing an in-memory cache in a file service may include operations such as receiving a request, by the in-memory cache, to read a file from a file system of the file service; in response to the received request, determining a file entry for the file that is stored in the in-memory cache, wherein the file entry comprises a counter defining a number of times the file has been requested to be read; in response to evaluating the counter according to a cache storage rule: obtaining, by the in-memory cache, the file from the file system; and storing the file in the in-memory cache to update the file entry; and providing, by the in-memory cache, the file as obtained from the file system.

Other implementations of this aspect include corresponding systems, apparatus, and computer programs, configured to perform the actions of the methods, encoded on computer storage devices.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
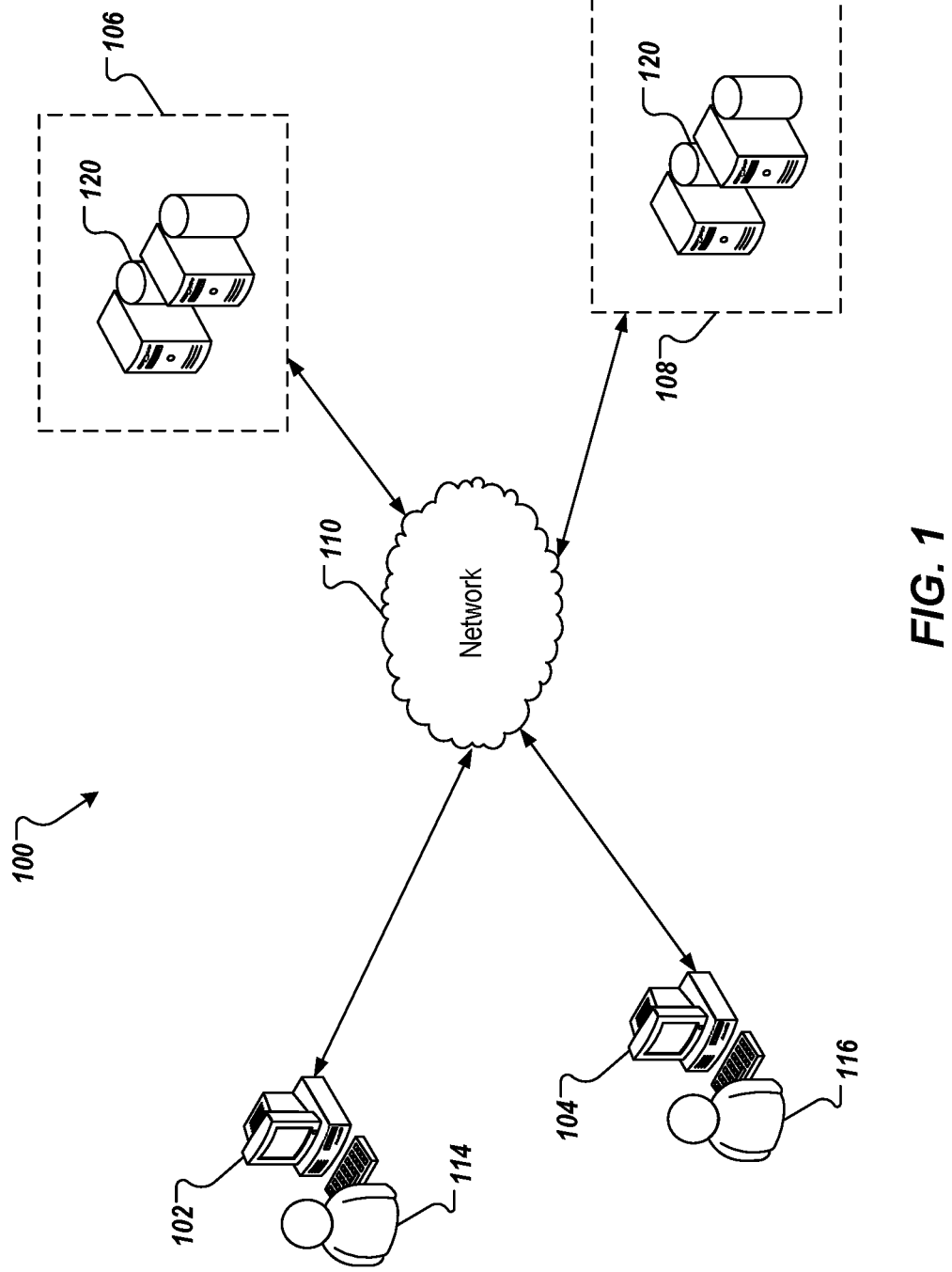
FIG. 1 illustrates an example computer system architecture that can be used to execute implementations of the present disclosure.

The present disclosure describes various tools and techniques for managing an in-memory cache to support auto-sizing features and to support faster reading of files.

In some instances, one or more file servers can be provided to store and provide access to files and directories in response to requests. In some instances, the file server(s) can be maintained in the context of a platform system (e.g., an on-premises or cloud platform). In some instances, file server(s) can be associated with one or more services or applications and can be used in the context of a single platform/system or multiple such platforms/systems.

In some instances, a file server can be under a heavy load when there are many clients (e.g., client applications or services) that are trying to download a file from the file server. In this case, the storage behind the file server (e.g., NFS or a local disk) may be a performance bottleneck due to many parallel input/output (I/O) requests received from the clients. In some instances, the performance of the file server can also be affected in cases where a client tries to download a huge number of small files from the file server (simultaneously or subsequently one after another). Each operation (e.g., reading, uploading, updating) for a file has some overhead and, when there are many files to be accessed, the delay can accumulate such that the total amount of time for downloading some or all of the files can be longer than acceptable or desirable.

In some instances, the performance of a file server can be improved if some of the files that are associated with most frequent requests for reading can be kept in an in-memory cache. For example, the most popular files (e.g., as files that are most frequently requested, or predefined files that are identified as important, e.g., based on user/client specification) can be stored in-memory and when queried they can be provided faster and without sending requests to the file server. Such storage of files in-memory can improve load balancing of the server, can improve the performance of the data acquisitions, and subsequently user experience and requests can be timely processed without delays. In those examples, when a user requests a file that is stored in-memory (requests performing reading operations for a file (through one or multiple clients)), the content of the file can be returned directly as a response from the in-memory cache, without any file system I/O operations. By storing most frequently retrieved files in the in-memory cache, the performance of the file server can be improved several times. For instance, when 10,000 files with total size 4.7 GB were read by a client from SSD disk, the total time was measured to be 39.5 seconds. When these files are in the in-memory cache, the total time to read them is 10.4 seconds.

In some implementations, the performance benefits of storing some files in-memory can be seen even clearer in those cases where the load on the file server is high and multiple requests are processed in parallel. In some cases, some or all of the requests can be associated with reading the same file, and if the file is stored the in-memory cache, the data acquisition can be performed faster as compared to obtaining the file from the file server while, at the same time, such acquisition can reduce the processing load on the file server that may handle other requests. Thus, the general processing of requests can be performed more efficiently, faster, and with reduced resource expenditures. In another example, if 10,000 files were to be read in parallel by 20 clients, the reading operation in testing was recorded to take 275.8 seconds. When the files are in the in-memory cache, the total time for executing read operations, as executed by 20 clients, was determined to be 43.6 seconds. The performance is almost 6.5 times better.

In accordance with implementations of the present disclosure, an in-memory file cache can be configured to define a counter for the number of read operations requested per file of the file server. Based on the counter number, a determination can be made whether to cache a file in the in-memory cache or not. For example, a threshold value can be defined for use in evaluating the counter number to determine whether to store the file in the cache. For example, the threshold value can be three (3). In such an example, if a file is requested to be downloaded three times, the counter for that file in the in-memory cache can be incrementally increased with each request. When it is determined that the threshold number of times requested (i.e., three (3)) is reached, the file can be stored in the in-memory cache.

In some implementations, the instances when a file is read from the cache can be identified based on the maintained counter for the reading operations. The stored files in the cache can be maintained together with a timestamp identifying the last time that a file has been read from the cache. As such, at each time that a file is requested for reading from the cache, the timestamp for the file at the cache can be updated.

In some implementations, the in-memory cache can be configured with an auto-sizing configuration implementing a cache sizing policy, where the cache sizing policy is used to remove files from the cache that have not been read recently. Such auto-sizing of the cache can dynamically support adjusting of the free space in the cache to allow for new files to be stored in the cache when those new files become relatively more popular or requested than some or all of those previously stored in the cache. In some instances, the in-memory cache auto-sizing can be defined based on sizing policy rules defined with a reference to the timestamps defining the last read operation performed for the files. In some instances, the in-memory cache can be configured to periodically or dynamically (e.g., based on an event or occurrence) remove files from the cache based on evaluating the timestamps of the files. For example, a periodic configuration can cause the files in the cache to be scanned every twenty-four (24) hours to determine whether a file from the files is to be removed in response to the total size of the cached files exceeding a certain threshold amount. In some instances, the rules for deleting files from the cache can also be defined with a reference to a threshold time period since the file has been accessed. For example, the rules can be configured to delete files that have not been accessed for a period of time (e.g., twenty-four (24) hours), which can be evaluated based on the stored timestamps for the files in the cache.

In some instances, the cache may be configured to include an allowed list (e.g., a "white" list) and/or a deny list (e.g., a "black" list) of folders for files at the storage of the file server. For the allowed list of folders, the cache can be allowed to cache files that are requested from an allowed folder. The files located in a denied folder will not be allowed to be cached, regardless of their relative popularity. The allowed and denied folders can be defined per file server in accordance with user-provided input and/or configuration rules for defining the status of the folder as allowed or denied. For example, the allowed list of folders can represent a list of folders that store popular binaries which are very frequently read. For example, in a cloud environment, such frequently requested files could be some runtimes, virtual machine images, agents, JVMs, and others, since those may be considered as likely to be read (e.g., frequently based on observations of reading operation requests) and installed on many virtual machines (VMs). In some instances, the allowed list and the deny list can be configured with rules that may include allow and/or deny name patterns for files or directories to be included in the cache or to be excluded from the cache. In some instances, the allowed list can include files that are defined as "always-in-cache" files or directories, which can be configured at the cache.

In some instances, processing read and/or write requests at a file service through an in-memory cache can improve the performance of the service execution. In some cases, one file service can be associated with one or more client applications which can request to read at least a portion of overlapping files. In some instances, a client application can be configured to have access to a set of directories or files in a file system that can overlap with at least one file that is accessible for another client application. When multiple client applications are running requests in parallel at a file service that is configured with an in-memory cache in accordance with the implementations of the present disclosure, the performance of the execution can be even further improved since the number of parallel requests from clients can increase and the storage of files in the cache can even further reduce the load on the file system. In general, reading operations performed at the file system are slower in execution compared to requests executed at the in-memory cache. Even further, parallel input/output operations executed at a file system also perform worse as compared to parallel processing at the in-memory cache. Thus, routing more requests to the in-memory cache can speed up the processing as well as reduce the load on the file system. In such a manner, the load between the file system and the in-memory cache can be spread more evenly. Further, the files that are maintained in the in-memory cache can be updated dynamically to address current trends and needs of clients based on observed requests and tracked metadata for the files in the in-memory cache.

FIG. 1 depicts an example architecture 100 in accordance with implementations of the present disclosure. In the depicted example, the example architecture 100 includes a client device 102, a client device 104, a network 110, and an environment 106 and an environment 108. The environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the environment 106 and/or environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the environment 106 includes at least one server and at least one data store 120. In the example of FIG. 1, the environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the environment 106 can host applications and services that are associated with a file service for storing files in a file system. In some instances, the environment 106 can include multiple cluster nodes that can represent physical or virtual machines. A hosted application and/or service can run on VMs hosted on a cloud infrastructure.

In some instances, the environment 106 and/or the environment 108 can be configured to host applications, services, and databases that may be designed, developed, executed, and maintained in relation to different customers and based on configured accounts that define process execution for the applications, the services, and the database. The applications, services, and/or database can use one or more file services to store files and/or to obtain files for reading and writing operations. In some instances, a file service can be hosted at one or more of the environments 106 and/or 108. The file service can be configured to store at least some of the files from the file system in an in-memory cache in accordance with implementations of the present disclosure and as described in FIGS. 2-7.

Figure 2:
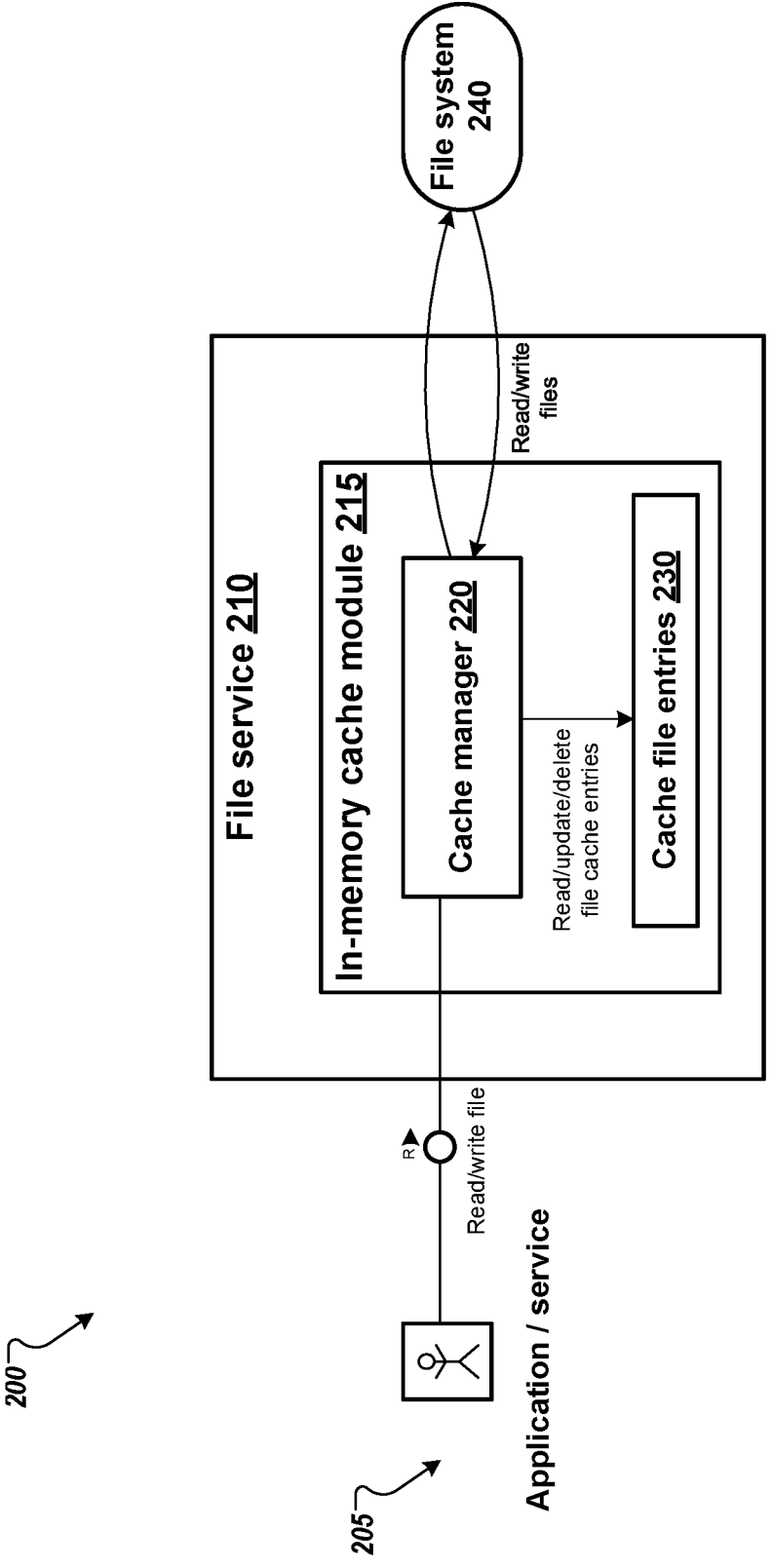
FIG. 2 is a block diagram for a server environment hosting a file service that stores files in an in-memory cache in accordance with implementations of the present disclosure.

FIG. 2 is a block diagram for a server environment 200 hosting a file service 210 that stores files in an in-memory cache in accordance with implementations of the present disclosure.

In some instances, the server environment 200 can be a platform environment (e.g., on premise or cloud platform environment) where multiple different entities may request to use services from a file service. In some instances, one or more customers may have defined accounts for use of a single file service (or multiple instances of a file service in a distributed way).

In some instances, the server environment 200 provides the file service 210, where the file service 210 is configured to include an in-memory cache module 215. The in-memory cache module 215 can act as a self-sufficient module for maintaining cached file and processing file input/output operations of the file service 210.

In some instances, the in-memory cache tools and techniques can be implemented in another service or application different from a file service to support execution of requests and data invocation that improves the performance of the service, distributes the load, provides faster response time, and improves the user experience. For example, an application or service can use a local or remote file system to store and read files, but can also have an internal cache to store some of the files and can utilize the techniques of the in-memory cache in a substantially similar manner to the provided example with the file service 210. In such an example, the application or service can be set up with an in-memory cache in accordance with the implementations of the present disclosure to store data associated with frequent requests (e.g., determined based on defined service criteria in substantially similar manner as discussed for the file service 210 throughout the present disclosure).

In some instances, the file service 210 may receive requests from applications and/or services 205. In some of those instances, the requests can be generated based on a user-provided input and/or based on internal evaluation and execution of a request based on implemented logic at the application and/or service 205. For example, an application 205 can request to read or write a file from the file service 210, where the file service 210 can manage the storage of files and the provision of their access through the in-memory cache module 215.

In some instances, the in-memory cache module 215 includes a cache manager 220 for handling all requests for reading/writing files received at the file service 210. When a file is read, the cache manager 220 can check entries in a cache 230 of file entries. The cache manager 220 can determine whether there is a file entry already present in the cache file entries 230 for the requested file. If such a file entry exists, a determination is made as to whether the file entry is empty or whether it includes file data. In some instances, a file entry can be created in the cache file entries 230 when a file is requested for reading or writing. The file entry may store data of the file if the file is supposed to be cached. For example, whether or not a file is supposed to be cached can be defined in a cache rule. The cache rule(s) can be maintained at the cache manager 220. In some instances, the cache rule(s) can be applied when a request to read a document is received. For example, when a file is requested to be read from a file system 240 three times, the cache manager 220 may determine to store the file in the cache file entries 230. In some instances, the cache rules can include a rule that defines that a file that falls into a particular set of files has to be or must be cached with the first request to be read. Other suitable cache rules can be applied. For example, the cache rules can include configurations for "black list" files (e.g., files that match a particular criterion to restrict caching of files from a given folder or otherwise), "white list" files (e.g., files that even when once requested are to be cached), or other caching rules that can correspond to accounts associated with the files, name evaluation (e.g., all files with a name including "Confidential" should not be cached, etc.), among other examples.

In some instances, if a file entry exists in the cache file entries 230 but does not include file data (i.e., the file has not been cached yet), the file can be provided by obtaining the file from the file system 240. If the file entry exists and the file data is included in the file entry in the cache file entries 230, the cached file data can be returned to the request for reading the file. In some instances, once a file entry is accessed, even if the file entry does not yet store the file data, a timestamp of the file entry can be updated to identify the time point when the file entry was accessed for the last time.

In some instances, when a request to read a file is received at the in-memory cache module 215, if the file is not yet cached, the cache manager 220 can request to obtain the file from the file system 240 and provide the file to the application 205. In some cases, when the file is sent to the application 205, the file can also be stored in the cache file entries 230, where the sending and the storing can be executed as parallel activities or as sequential activities.

In some instances, the application/service 205 can request that a file is uploaded (written) at the file system. In some instances, the file that is uploaded may be a newer version of a version of the same file that has already been cached by the in-memory cache module 215. In those cases, if the request is to upload a file, the cache manager 220 can instruct the storing of the file at the file system 240, e.g., to replace the previous version, and at the same time or subsequently, to request to update the storage of the cache file entries 230.

In some instances, the cache file entries 230 can include metadata for the file entries. In some instances, the cache file entries 230 include a map structure as a key-value store where a key is a file path stored as String, and the corresponding value is an FileEntry object including metadata. For example, the metadata can include one or more of the following variables:

Count variable of type Long—includes a number of times the file is read;

Timestamp variable of type Long—the time in milliseconds when the file was last accessed;

File path variable of type String—the file path;

Status variable of type boolean—identifies whether the data of the file is ready to be consumed from the cache. If false, the data is not complete or up to date;

Reading status of type boolean—If true, shows the data is currently being read from file system;

Binary data of type byte[ ]—the binary data of the file.

Figure 3:
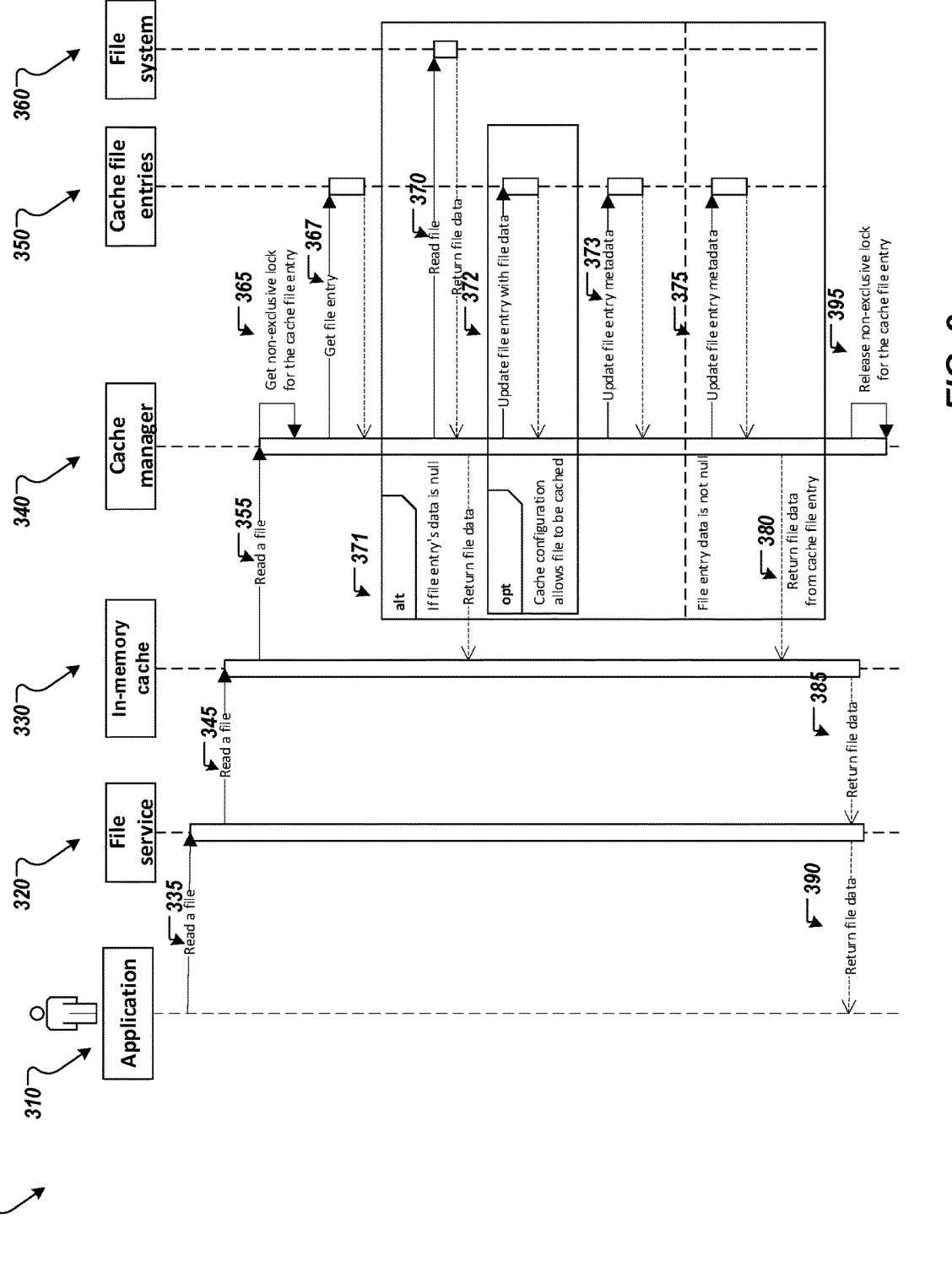
FIG. 3 is a sequence diagram for an example method for reading a file from a file service that maintains data in an in-memory cache in accordance with implementations of the present disclosure.

FIG. 3 is a sequence diagram for an example method 300 for reading a file from a file service 320 that maintains data in an in-memory cache 330 in accordance with implementations of the present disclosure.

In some instances, the file service and the in-memory cache 330 can be substantially the same as the file service 210 and the in-memory cache 215 of FIG. 2. In some instances, an application 310 that is communicatively coupled to the file service 320 can request to read a file from the file service at 335. In some instances, the file can be read from a file system 360 for storing files of the file service 320 or from the in-memory cache 330 if the file has been cached. For example, a file can be added in the cache after a specified number of read requests (e.g., three (3)), for example, for a particular period of time (e.g., one (1) day). This can prevent the cache capacity to be quickly filled up with files that were read only once. In some instances, the cache capacity can be configured with a threshold value (e.g., 80%) that when exceeded can be configured to send a notification to the cache manager 340 to consider managing the content of the cache. Managing the content of the cache can include, for example, removing cached files that are not regularly and/or recently accessed, or that are not relatively regularly and/or recently accessed as compared to other files. In some instances, the in-memory cache 330 can implement cache rules at the cache manager to determine when to cache a file (e.g., when a file is requested to be read, when a file is requested to be updated, or when a file is requested to be uploaded). In some instances, if a file belongs to a directory in the file system 360 that is listed in an allowed list of directories configured for the in-memory cache 330, the files may be stored in cache file entries 350 of the in-memory cache 330 when the file is first read from the file system 360. In some instances, a file may not be stored in the cache file entries 350 if its size is above a configured value. For example, the configured value can be a particular file size, or the size of the file can be considered together with the size of other files stored in the file system 360 and it can be determined whether storing the file would exceed the threshold value configured for the cache capacity. In some instances, the configured value for comparing with the file size can be a user-provided value that can be specific to a client application such as the application 310, or a default value configured for the size of the cache file entries 350 that is not to be exceeded if a new file is cached, as well as others.

Based on the requests 335 it receives, the file service 320 can send a read request 345 for the file to the in-memory cache 330. The in-memory cache 330 can transfer the request at 355 to the cache manager 340, where the cache manager 340 can obtain, at 365, a non-exclusive lock for a file entry for the cache file entries 350. At 367, the cache manager 340 can obtain the file entry from the cache file entries 350. In some instances, the file entry can include only metadata for the file (e.g., number of times that the file has been requested to be read, a timestamp from the latest request, or other information), the file entry can be an empty entry, or the file entry can be an entry including data for the requested file for reading.

At block 371, different options for the content of the file entry can be processed. If the file entry's data is null (i.e., the file entry is empty), the cache manager 330 can read the file at 370 from the file system, as the file has not been cached yet. If the cache configuration is defined to allow for the file to be cached (e.g., based on evaluating cache rules such as the number of times the file is accessed and whether it matches with a cache number criterion, or whether the file falls into a list of files allowed to be cached immediately or from a directory that falls in such a category, among other examples), then the file entry is updated, at 372, and the file data is stored in the file entry at the cache file entries 350. Once the file is either read at 370 and/or the file entry is updated with caching the file (at 372), the file entry metadata can be updated at 373. The updating of the metadata can include an update of the timestamp for the latest time that the file has been accessed, and/or the number of times the file has been requested for accessing, among other example properties data relevant for the file and the accessing (e.g., last user to access, last application associated with the request, etc.).

In cases where it is determined that the file entry is not null, the file entry metadata can be updated at 375. For example, the update of the metadata may be made according to the time and request for the reading of the file (as in 335, 345, and 355). The updated metadata can include data about a time point when the file is accessed for the last time, a user associated with the request, an application associated with the request, or other relevant information. At 380, the file data can be returned from the cache file entry by the cache manager 340 to the in-memory cache at 380, where, at 385, the file data can be transferred to the file service 320 and then provided as a response at 390 to the application 310.

Figure 4:
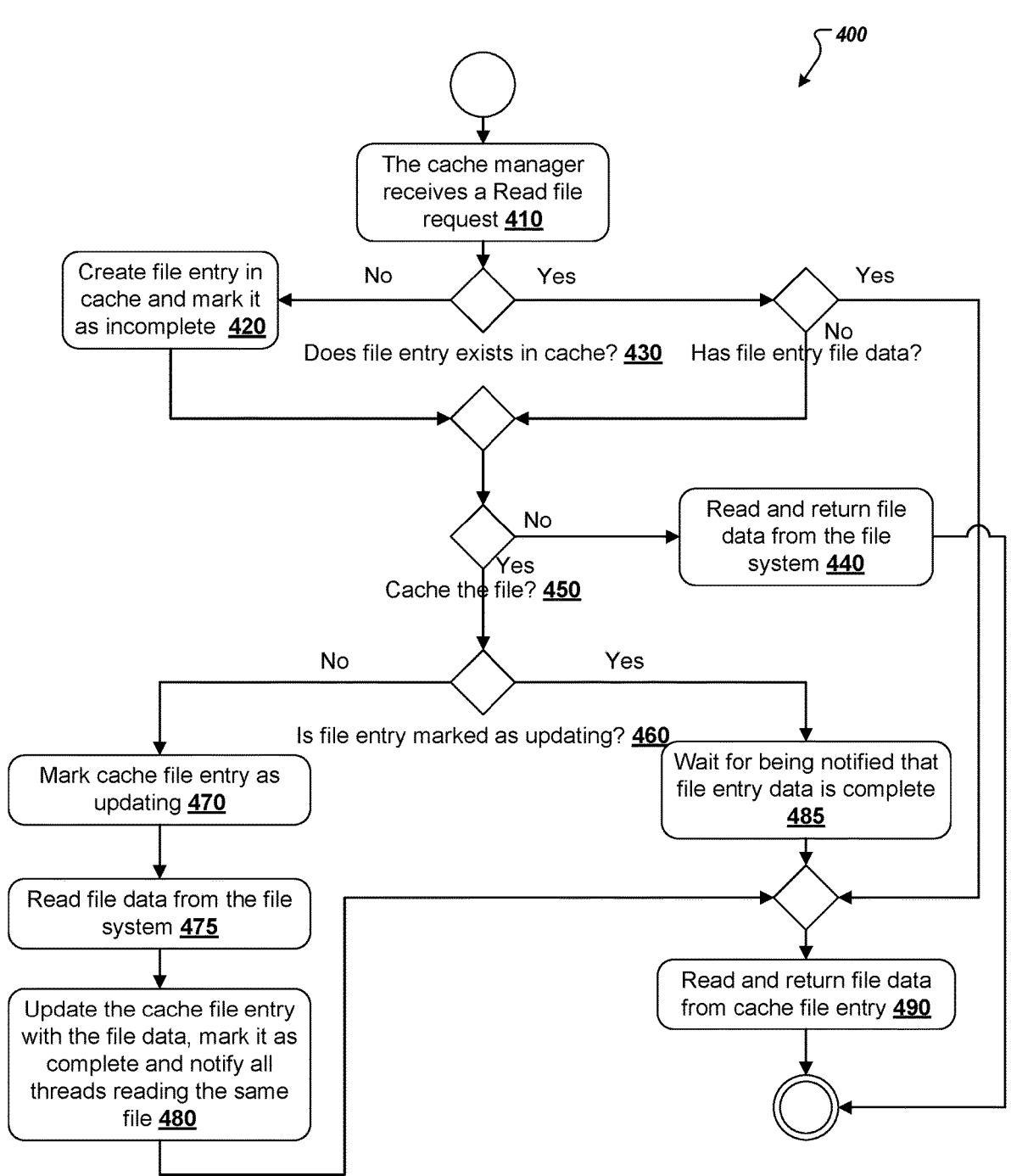
FIG. 4 is a flow diagram for an example method for reading a file from a file service when a file entry is currently updating in accordance with implementations of the present disclosure.

FIG. 4 is a flow diagram for an example method 400 for reading a file from a file service when a file entry is currently updating in accordance with implementations of the present disclosure. In some instances, the method 400 can be executed at an in-memory cache that can be substantially similar to the described in-memory caches in FIGS. 2 and 3. In some instances, the method 400 is executed in the context of a received request to read a file from a file service, where files are stored at a file system, and where the file service caches some of the files at the in-memory cache to improve the performance of the execution of the reading operations.

In some instances, reading a file that is currently updated with new content can be handled by the in-memory cache as described in the present disclosure. In some instances, when a file is being read from the file system, the corresponding file entry in the cache file entries is updated with the read content. In some case, while the file entry is loaded in the in-memory cache, parallel requests for reading that file can be received, where those requests can be queued at the in-memory cache to wait until the content is loaded in the in-memory cache, without allowing the requests to reach the file system.

In some instances, to provide a file data that is currently updated, may require the cache manager to check with the file system and wait until the updating is completed, to obtain the file in the cache and respond to a request for reading the file. In some instances, if there are other requests for the same file that is currently being updated, and the same file is already associated with a prior request for reading, the subsequent requests can be put on hold. Once the first request is processed and the file data is cached, the subsequent requests can be promptly served based on the cached entry, rather than being transferred as requests to the file system where slower processing may occur.

At 410, a cache manager of the in-memory cache receives a read request for a file. If, at 430, it is determined that a file entry exists in the cache file entries of the in-memory cache, and the file entry includes file data, then, at 490, the file data from the cache file entry is read and is provided to the file service to serve the request. If at 430, it is determined that the file entry exists in the cache file entries and the file entry does not include file data (i.e., the file is not yet cached), then at 450 it is determined whether to cache that file. If it is determined that the file does not have to be cached, then at 440 the file is read from the file system and provided to the file service as output for the reading request. In some instances, the determination whether to cache or not a file can be defined at cache rules configured at the cache manager and defining conditions for determining when and under what circumstances to store a file in the cache. If, at 450, it is determined that the file has to be cached, then, at 460, it is determined whether the file entry is currently marked as updating or whether the file entry is in an updated state. If the file entry is marked as currently updating in the cache (e.g., because the file content is still being loaded from the file system), then, at 485, the cache manager can wait to be notified that the entry update is finished before the cache manager proceeds with reading and providing the file data of the file from the cache file entry to serve the reading request at 490.

If it is determined that the file entry is not marked as updating at 460, the cache file entry can be marked as updating at 470, and the file data can be read from the file system at 475. At 480, the cache file entry can be updated with the file data by reading the file from the file system, and the cache file entry can be marked as completed. In some instances, the caching of a file that was in the process of updating can be performed for a period of time while multiple requests to read that file can be send. Thus, if there was at least one more request for that file, at 480, the other thread associated with a request for that file, could be notified that the file is updated and provided with the file data from the in-memory cache. Once the cache file entry is updated at 480, the file data is provided as a response to the request at 490.

In some instances, when a file is being modified, an exclusive lock can be applied on the file to prevent other threads from reading or modifying the same file. In some instances, when a file is deleted, the corresponding cache file entry can be deleted in response to a notification for the initiation of the deletion.

Figure 5:
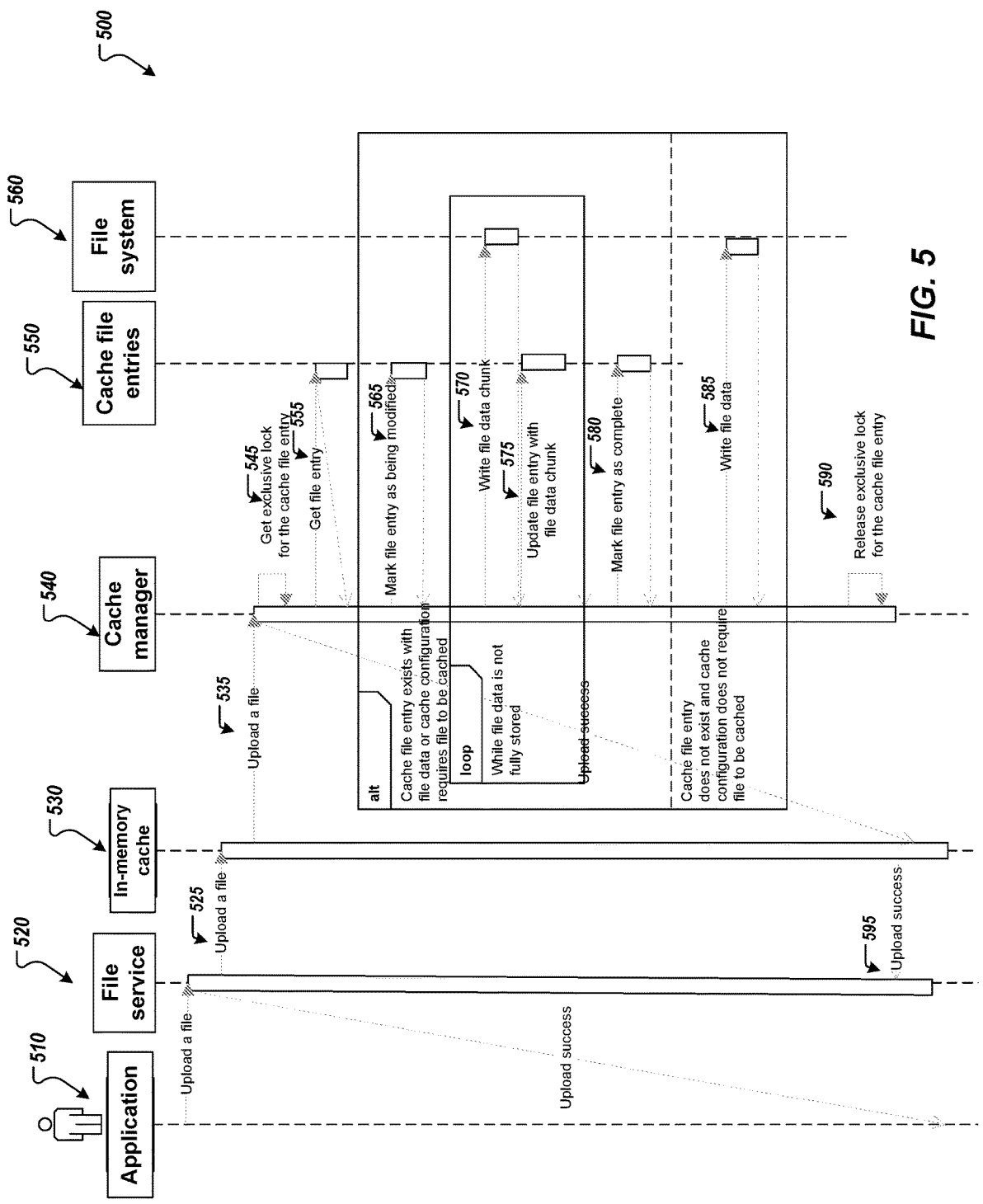
FIG. 5 is a sequence diagram of an example method for uploading a file through a file service in accordance with implementations of the present disclosure.

FIG. 5 is a sequence diagram of an example method 500 for uploading a file through a file service in accordance with implementations of the present disclosure. In some instances, the method 500 can be executed in the context of providing a file service that maintains an in-memory cache 530 in accordance with the present implementations and as described in relation to FIGS. 2, 3, 4, 6, and 7. In some instances, for the file service 520 to support fast execution of reading requests, the in-memory cache 530 is configured to process requests for uploading files on the file system 560 that can also be processed through the in-memory cache. The processing of the files can include collecting data for the files that can include metadata for the files (e.g., when a file is updated) or file data (e.g., for a new file). In some instances, the configurations for processing requests for uploading files can be provided in addition to configurations for processing read requests received at the file service 520 as described in relation to FIGS. 3 and 4.

In some instances, an application 510, which may be substantially similar to the application 205 of FIG. 2 and/or application 310 of FIG. 3, can send a request to upload a file at the file service 520. Once the file service 520 receives a request to upload a file, the file service 520 forwards the request to an in-memory cache at 525. The in-memory cache can be configured to handle the uploading of the file by providing instructions to upload (at 535) to the cache manager 540. The cache manager 540 can obtain, at 545, an exclusive lock for a cache entry corresponding to the file to be uploaded. At 555, the cache manager 540 can obtain a file entry for the file from the cache file entries 550.

In some instances, once the file entry is obtained, a determination can be made as to whether the file entry includes the file data, or whether that the file to be uploaded complies with a cache upload rule defined at the cache manager 540. The file entry can then be processed, and a first mark (e.g., a flag or metadata for the file) for the file entry can be made in the cache file entries 550 to indicate that the file is currently modified at 565. In doing so, the file entry at the cache file entries is marked as not in a complete state (or in an incomplete state, in some instances). However, if other requests are received for that file at the cache file entries 550, the file entry may still include sufficient information for the subsequent request to either wait for the update to complete or all the request to be navigated to the file system 560. The cache manager 540 can initiate a process or operation to write the file into the file system 560. For example, at 570, the write operation can be performed in loops to read chunks of the data. At each cycle, a next chunk of the data is written in the file on the file system and the same data chunk (e.g., bytes) is written in the cache's file entry. Once the write operation is completed (at 575), the cache manager 540 can be notified, and the cache manager 540 can then trigger an update of the file entry into the cache file entries 550.

Once the uploading of the file has been successfully completed at the file system 560 and at the cache file entries 550, the file entry in the cache file entries 550 can be updated and marked as completed (e.g., by updating the metadata of the file entry).

In some other cases, once an attempt to obtain the file entry from the cache file entries 550 is made at 555, a determination can be made whether that file entry does not exist and/or that the file provided for uploading is not considered as required for caching based on an evaluation of the cache rules in the cache manager 540. In that case, the cache manager 540 can omit storing the file in the cache, and can write the file only into the file system 560.

The cache manager 540 can release the obtained exclusive lock for the cache entry at 590, and a result from the upload operation can be provided from the in-memory cache to the file service 520 at 595.

Figure 6:
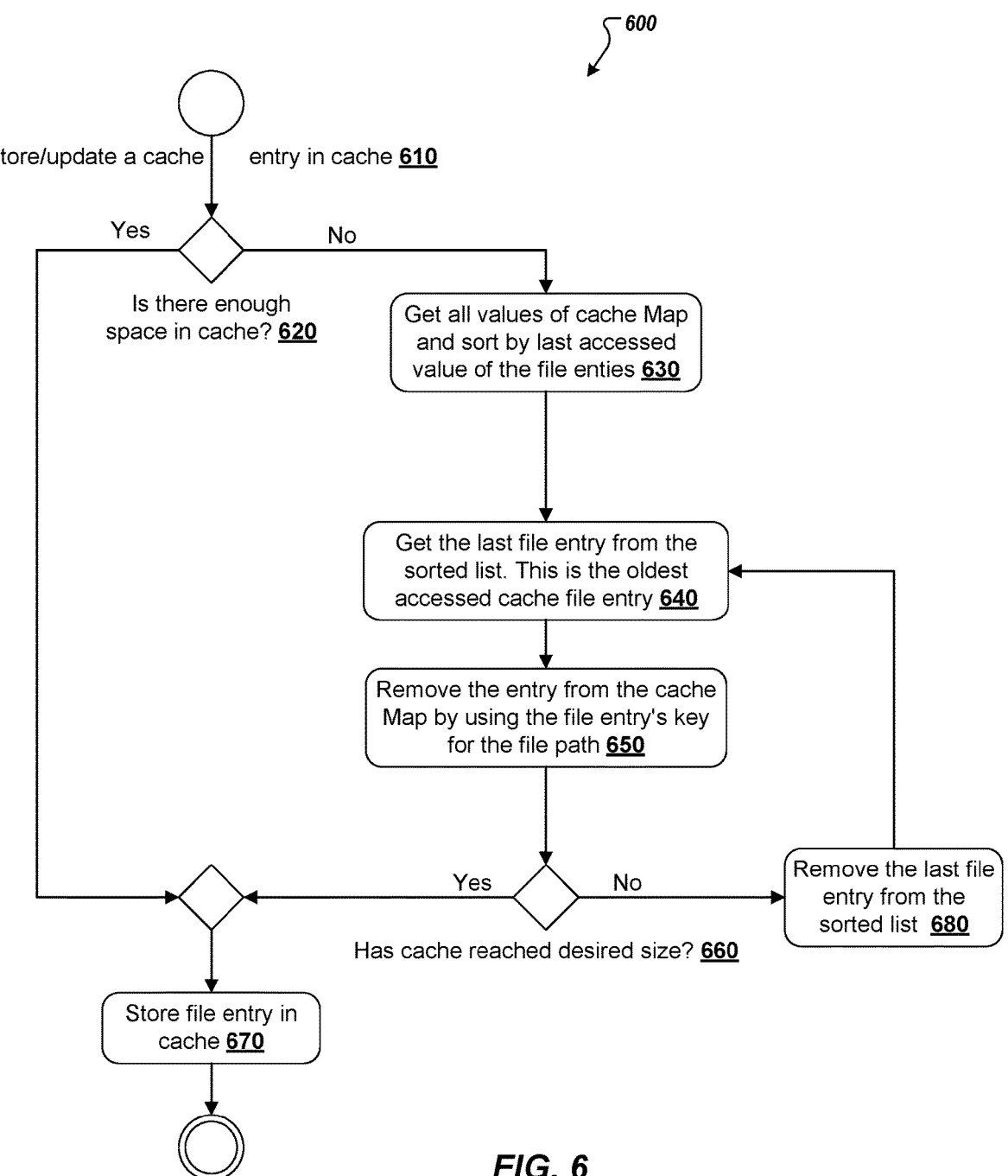
FIG. 6 is a flow diagram of an example method for managing the storage of an in-memory cache of a file service in accordance with implementations of the present disclosure.

FIG. 6 is a flow diagram of an example method 600 for managing the storage of an in-memory cache of a file service in accordance with implementations of the present disclosure. In some instances, the in-memory cache can be substantially the same as the discussed in-memory cache in FIGS. 2, 3, 4, and 5. The in-memory cache can be configured in a file service to store files from the file system and to support fast execution of reading operations. The method 600 can support managing the space of the cache so that it is optimized for handling changes in the observed trends for files that are accessed more frequently and/or more recently and to allow to update the content of the cache in an automatic manner.

In some instances, when a request for storing and/or updating a cache entry is received at a cache (at 610), the request can trigger a maintenance process for the space of the in-memory cache. The maintenance process can be used to determine whether to remove one or more, or alternatively, none, of the files of the cache entry to auto-size and manage the space. In some instances, the triggering of the maintenance can be based on an active request for executing a process to remove items from the file entries in the cache, or it can be configured in a periodical manner (e.g., set up for execution every seven days, every twenty-four hours, or other configuration that can be configured based on user input or historically learned).

In some instances, at 620, a determination can be made as to whether there is enough space in the cache. For example, the currently used space in the cache can be compared to a threshold value to determine whether there is enough space. The threshold value can be manually defined by a user or admin, or can be dynamically (and/or automatically) defined based on historical and/or projected system needs. Any other suitable means of setting the threshold can be applied. For example, when the cache is almost full (e.g., 95% of the specified maximum size), the cache can be reduced in order to free additional space for new files that are currently more relevant (or popular in the sense of being more frequently requested), particularly where there is a relatively higher demand for reading them then some of the existing files in the cache. In some instances, it can be desired to reduce the space currently occupied in the cache to a specified or desired size (e.g., 75% of the maximum size) based on the following steps.

At 630, values of entries in a cache map maintained at the in-memory cache can be obtained. In some instances, all values of the entries in the cache map can be obtained, while in others, only a subset of all values may be. The entries in the cache map are stored as key-value pairs. The values can be sorted in accordance with the timestamps of the entries defining when the entry was last accessed. At 640, the last file entry from the sorted list, which would have the oldest timestamp, can be obtained (i.e., the file entry at the end of the sorted list that has been accessed at the longest point back in time). At 650, the entry associated with the oldest accessed cache file entry (as determined at 640) can be removed from the cache map. The particular file can be selected or identified for deletion by using a key matching to the determined key value, where the key is used for the file path to locate the file entry within the cache file. In some cases, if the current cache file entry is matching a configuration to keep the file "always-in-cache" then step 650 is skipped.

At 660, a determination can be made as to whether the cache size has reached a size that corresponds to, or is less than, a size threshold defined for the cache (as identified in 620). If it is determined that increasing the free space in the cache by the size of the file entry (as identified at 640 and 650) does not change the fact that the size of the cache still cannot meet the criteria to be lower and does not allow to keep the desired free space in the cache, then, at 680, the file entry can be removed and the process of evaluating the sorted values of the cache map and removing the oldest file can be repeated at 640 and 650 until the free space in the cache meets a desired free space (as checked at 660). In some instances, file entries in the cache can be deleted one by one starting from the oldest accessed files until the cache size is reduced to a required, pre-defined level (e.g., 75% of maximum size). In some instances, multiple file entries can be determined as relevant for deletion and can be deleted in bulk and as part of a single operation.

If the cache free space has reached a desired size (e.g., a threshold value of 25% free space in the cache that corresponds to 75% of occupied space), then the received file for storing or updating at 610, can be stored as a file entry in the cache at 670.

Figure 7:
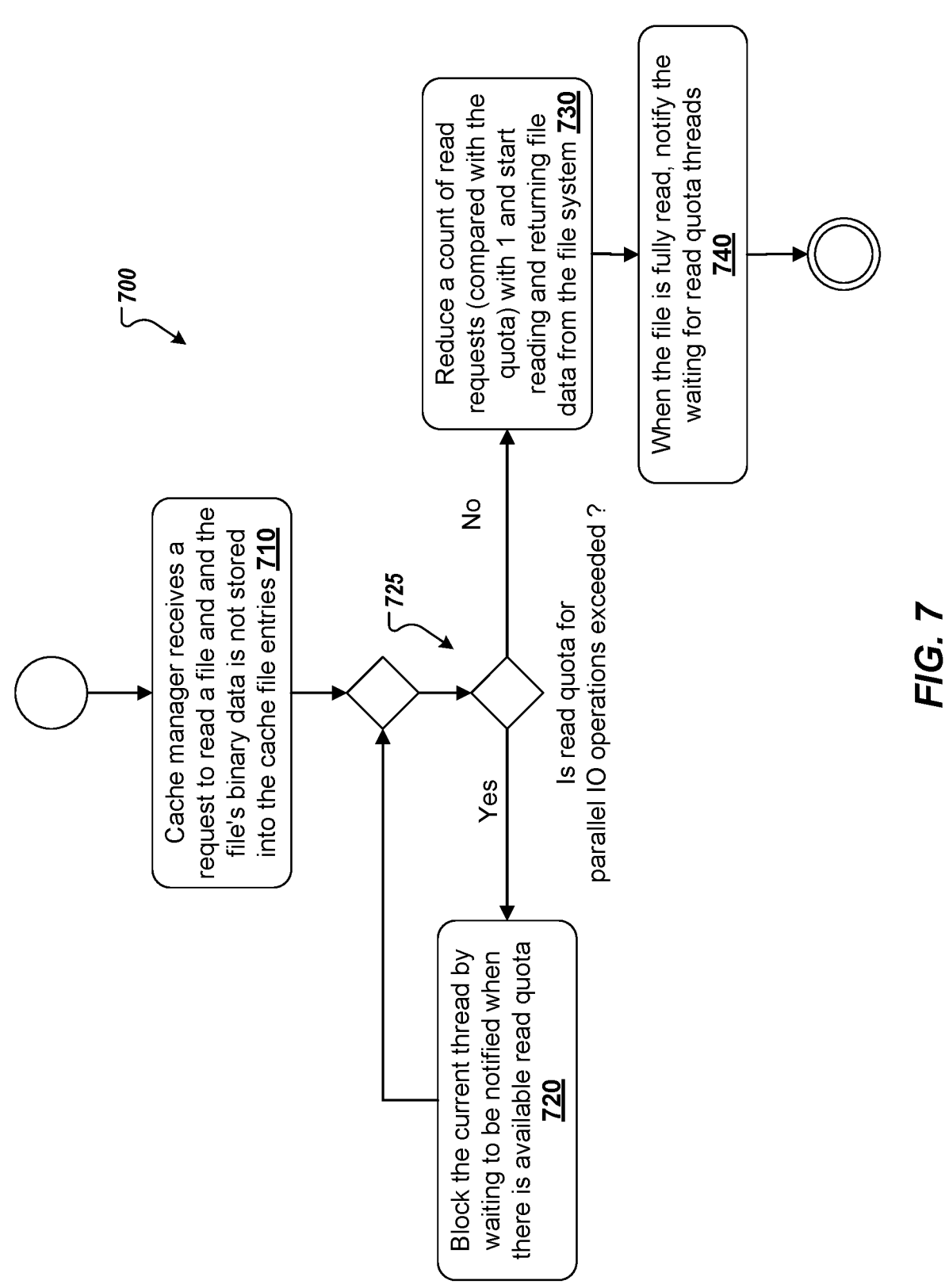
FIG. 7 is a flow diagram of an example method for managing requests for reading a file at an in-memory cache of a file service in accordance with implementations of the present disclosure.

FIG. 7 is a flow diagram of an example method 700 for managing requests for reading a file at an in-memory cache of a file service in accordance with implementations of the present disclosure. In some instances, the method 700 can be executed in the context of managing and processing read requests at an in-memory cache as described in relation to FIGS. 2, 3, 4, 5, and 6.

In some instances, a file service may store files in an in-memory cache that are a portion of the files from files stored in the file system. The stored files in the cache can be dynamically changed to correspond to files that are most frequently accessed, to comply with cache rules for the cache, and/or to comply with auto-sizing criteria for maintaining the space of the cache full to a certain level that can allow inclusion of further files upon determination or request.

At 710, the cache manager of the in-memory cache can receive a request to read a file. The cache manager can correspond to the in-memory cache module 215 of FIG. 2, or the cache manager described in FIG. 3 and FIG. 5. In response to the request, it can be determined that binary data of the file is not stored in the in-memory cache. At 725, it can be determined whether a quota to execute parallel threads for input/output operations is exceeded. The quota can be configured at the cache manager and can define a number of threads that are allowed to execute input/output operations, such as reading a file from the file system. In some instances, the cache manager can maintain a counter to keep track of the number of threads that are opened to process requests for reading files at the file service.

In response to determining that the quota is exceeded, at 720, the current thread for the received request at 710 can be blocked and kept in a waiting state until notified that there is available quota to execute the read operation.

In some cases, after determining that the read quota is not exceeded, a count of the read requests can be reduced by one at 730, and the reading operation can be executed to return the file data for the requested file from the file system. At 740, when the file is fully read, a thread created for reading the file based on another request is notified. That other thread may be in process at the cache manager, and can be kept in a waiting mode to read the file from the cache. In some instances, even if such requests for that file are requests that exceed a quota of acceptable read requests, the request may be put in a waiting mode rather than denied. The request can then be notified with the file data read from the cache when the first thread that is processed at 730 has completed its execution.

In accordance with the method 700, when a file is read multiple times by different threads and the file is not in the cache, the first request is associated with a reading operation of the file from the file system while the rest of the threads are waiting in the cache library for the file content to be available in the cache and then, the rest of the threads may read it directly from the cache (e.g., and do not execute a read operation from the file system).

Figure 8:
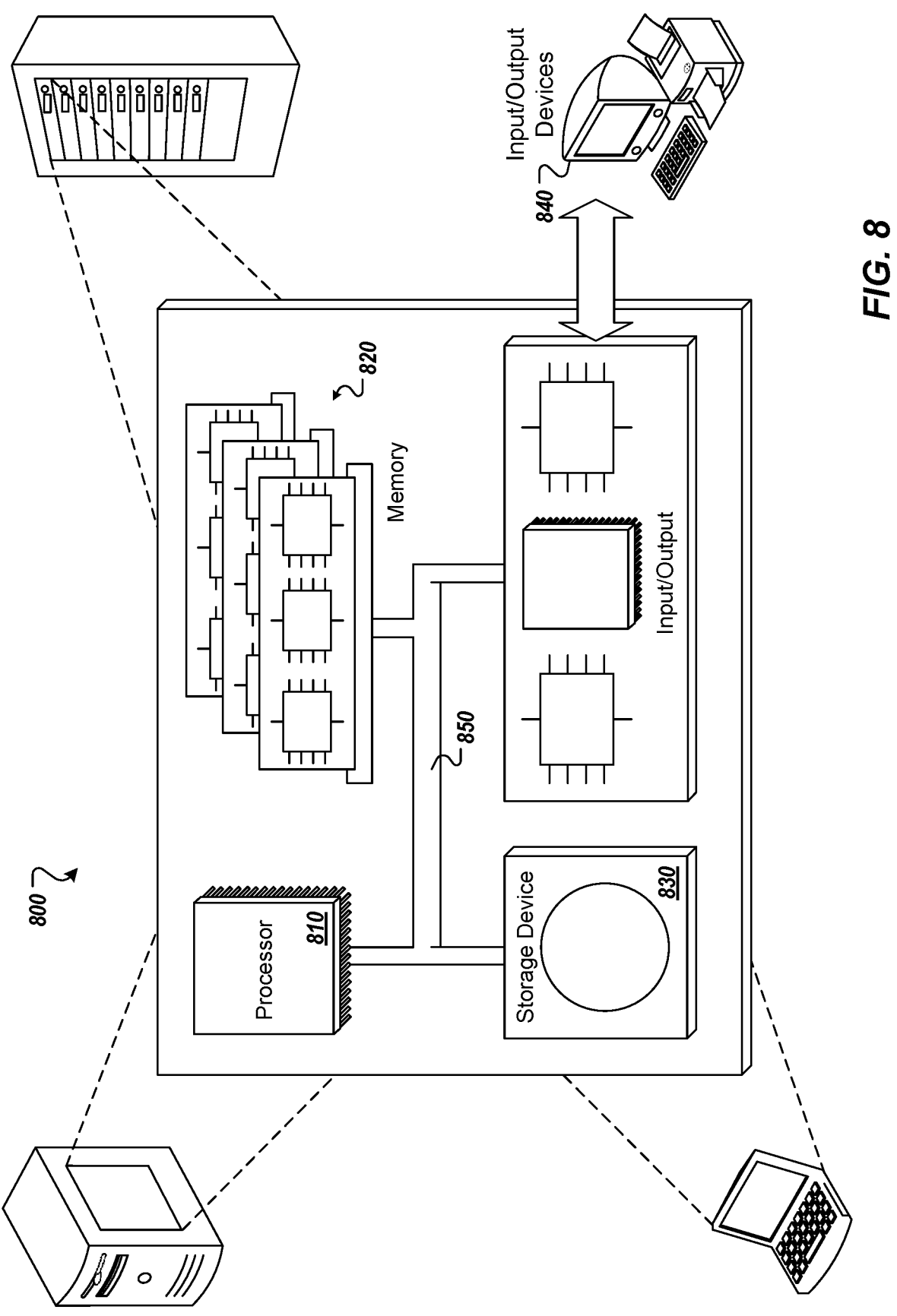
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, and 840 are interconnected using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In some implementations, the memory 820 is a volatile memory unit. In some implementations, the memory 820 is a non-volatile memory unit. The storage device 830 is capable of providing mass storage for the system 800. In some implementations, the storage device 830 is a computer-readable medium. In some implementations, the storage device 830 may be a floppy disk device, a hard disk device, an optical disk device, or a tape device. The input/output device 840 provides input/output operations for the system 800. In some implementations, the input/output device 840 includes a keyboard and/or pointing device. In some implementations, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also (alternatively) defined in accordance with the following examples:

Example 1. A computer-implemented method for managing an in-memory cache in a file service, the method comprising:

receiving a request, by the in-memory cache, to read a file from a file system of the file service;

in response to the received request, determining a file entry for the file that is stored in the in-memory cache, wherein the file entry comprises a counter defining a number of times the file has been requested to be read;

in response to evaluating the counter according to a cache storage rule:

obtaining, by the in-memory cache, the file from the file system; and storing the file in the in-memory cache to update the file entry; and providing, by the in-memory cache, the file as obtained from the file system.

Example 2. The method of Example 1, the method further comprising:

receiving a request to upload a file through the file service at the file system;

requesting, by a cache manager of the in-memory cache, to upload the file into the file system; and in response to receiving a notification for a successful upload of the file, providing a response to the request for the successful upload.

Example 3. The method of Example 2, wherein prior to requesting to upload the file in the file system, the method further comprising:

obtaining, by the cache manager and from a file cache of the in-memory cache, a file entry for the file and marking the file entry in a status modified.

Example 4. The method of Example 3, wherein in response to receiving the notification for the successful upload of the file, updating the file entry with data of the file to be uploaded.

Example 5. The method of Example 4, wherein the updating of the file entry with data is performed in file data chunks until all the data of the file is stored in the file cache, and wherein in response to uploading the file into the file cache, the method further comprises updating the status of the file entry to a status completed.

Example 6. The method of any one of the previous Examples, wherein in response to evaluating the file entry for the file in the in-memory cache, the method further comprising:

determining that the file is currently updated in the in-memory cache;

updating the file entry to identify that the file is in an updating state; and requesting to read the file from the file system.

Example 7. The method of any one of the previous Examples, the method further comprising:

in response to determining that the requested file is in a currently updated state in the in-memory cache, determining that a second thread had obtained the file from the file system; and providing the obtained file from the file system by the second thread as a response to the received request.

Example 8. The method of any one of the previous Examples, the method further comprising:

receiving a new request to store or update a cache entry into the in-memory cache; and in response to the new request:

obtaining values for entries in a cache map of the in-memory cache, wherein each of the entries is associated with a stored file in the in-memory cache that is obtained from a file system of the file service, wherein the values include respective timestamps for the latest timepoint when the respective files were accessed;

in response to determining that a threshold limit for storage in the in-memory cache is exceeded, sorting the values for the entries in an order of the timestamps from the latest to the oldest; and iteratively identifying one or more entries associated with one or more corresponding files that are associated with respective timestamps that are at an end of the sorted values associated with entities with the oldest timestamps in the order, wherein the identified one or more entities are to be deleted from the in-memory cache so that a storage space occupied by files maintained in the in-memory cache complies with the threshold limit for the storage.

Example 9. The method of any one of the previous Examples, wherein determining the file entry for the file comprises determining that binary data of the file is not stored in the in-memory cache, wherein in response to determining that the binary data is not stored in the in-memory cache, the method further comprises:

determining whether a quota to execute parallel threads for input/output operations is exceeded;

in response to determining that the quota is not exceeded, reducing a count of current parallel threads for input/output operations by one and obtaining the file from the file system;

in response to obtaining the file from the file system, notifying a thread that is in process at the cache manager and is associated with a request for reading the file; and providing the read file in response to the received request and to another request associated with the notified thread.

Example 10. A computer-implemented method for managing an in-memory cache of a file service, the method comprising:

receiving a request, by the in-memory cache, to read a file from a file system of the file service;

in response to the received request, determining a file entry for the file that is stored in the in-memory cache;

in response to evaluating the file entry for the file in the in-memory cache, determining that the file is currently updated in the in-memory cache;

updating the file entry to identify that the file is in an updating state; and requesting to read the file from the file system;

obtaining, by the in-memory cache, the file from the file system; and updating the file entry in the in-memory cache with the obtained file from the file system; and in response to determining that the file is requested to be read by at least one other request, notifying at least one thread generated for reading the file based on the at least one other request to obtain the file entry as updated; and providing, by the in-memory cache, the file as obtained from the file system.

Example 11. A computer-implemented method for managing free space on an in-memory cache of a file service, the method comprising:

obtaining values for entries in a cache map of the in-memory cache, wherein each of the entries is associated with a stored file in the in-memory cache that is obtained from a file system of the file service, wherein the values include respective timestamps for the latest timepoint when the respective files were accessed;

in response to determining that a threshold limit for storage in the in-memory cache is exceeded, sorting the values for the entries in an order of the timestamps from the latest to the oldest; and iteratively identifying one or more entries associated with one or more corresponding files that are associated with respective timestamps, wherein the one or more entries are entries at the end of the order and associated with the oldest timestamps from the sorted values, wherein the identified one or more entries are to be deleted from the in-memory cache so that a storage space occupied by files maintained in the in-memory cache complies with the threshold limit for the storage.

Example 12. A computer-implemented method for providing access to files by a file service storing a plurality of the files in an in-memory cache, the method comprising:

receiving a request, at a cache manager of the in-memory cache, to read a file;

in response to the request, determining that binary data of the file is not stored in the in-memory cache;

determining whether a quota to execute parallel threads for input/output operations is exceeded;

in response to determining that the quota is not exceeded, reducing a count of current parallel threads for input/output operations by one; and obtaining the file from a file system associated with the file service;

in response to obtaining the file from the file system, notifying a thread that is created for reading the file by providing the file from the in-memory cache, wherein the thread is based on another request that is received at the cache manager; and providing the read file in response to the other request associated with the notified thread.

Example 13. A non-transitory, computer-readable medium coupled to one or more processors and having instructions stored thereon which, when executed by the one or more processors, cause the one or more processors to perform operations according to any one of the methods of claims 1 to 12.

Example 14. A system comprising a computing device; and a computer-readable storage device coupled to the computing device and having instructions stored thereon which, when executed by the computing device, cause the computing device to perform operations according to any one of the methods of claims 1 to 12.

What is claimed is:

1. A computer-implemented method for managing an in-memory cache in a file service, the method comprising:

receiving a request, by the in-memory cache, to read a file from a file system of the file service;

in response to the received request, determining that binary data of the file is not stored in the in-memory cache;

determining whether a quota to execute parallel threads for input/output operations is exceeded;

in response to determining that the quota is not exceeded, reducing a count of current parallel threads for input/output operations by one; and obtaining, by the in-memory cache, the file from the file system;

in response to obtaining the file from the file system, notifying a thread that is in process at a cache manager of the in-memory cache and is associated with another request for reading the file; and providing the file as read in response to the other request associated with the notified thread.

2. The method of claim 1, the method further comprising:

receiving a request to upload a file through the file service at the file system;

requesting, by the cache manager of the in-memory cache, to upload the file into the file system; and in response to receiving a notification for a successful upload of the file, providing a response to the request for the successful upload.

3. The method of claim 2, wherein prior to requesting to upload the file in the file system, the method further comprising:

obtaining, by the cache manager and from a file cache of the in-memory cache, the file and marking the file entry in a status modified.

4. The method of claim 3, wherein in response to receiving the notification for the successful upload of the file, updating the file entry with data of the file to be uploaded.

5. The method of claim 4, wherein the updating of the file entry with data is performed in file data chunks until all the data of the file is stored in the file cache, and wherein in response to uploading the file into the file cache, the method further comprises updating the status of the file entry to a status completed.

6. The method of claim 4, further comprising:

evaluating the file entry for the file in the in-memory cache, the evaluating method further comprising:

determining that the file is currently updated in the in-memory cache;

updating the file entry to identify that the file is in an updating state; and requesting to read the file from the file system.

7. The method of claim 1, the method further comprising:

in response to determining that the requested file is in a currently updated state in the in-memory cache, determining that a second thread had obtained the file from the file system; and providing the obtained file from the file system by the second thread as a response to the received request.

8. The method of claim 1, the method further comprising:

receiving a new request to store or update a cache entry into the in-memory cache; and in response to the new request:

obtaining values for entries in a cache map of the in-memory cache, wherein each of the entries is associated with a stored file in the in-memory cache that is obtained from a file system of the file service, wherein the values include respective timestamps for the latest timepoint when the respective files were accessed;

in response to determining that a threshold limit for storage in the in-memory cache is exceeded, sorting the values for the entries in an order of the timestamps from the latest to the oldest; and iteratively identifying one or more entries associated with one or more corresponding files, wherein the one or more entries are associated with respective timestamps that are with the oldest timestamps in the order of the values for the entries, wherein the one or more entries are to be deleted from the in-memory cache so that a storage space occupied by files maintained in the in-memory cache complies with the threshold limit for the storage.

9. A non-transitory, computer-readable medium coupled to one or more processors and having instructions stored thereon which, when executed by the one or more processors, cause the one or more processors to perform operations for managing an in-memory cache in a file service, the operations comprising:

receiving a request, by the in-memory cache, to read a file from a file system of the file service;

in response to the received request, determining that binary data of the file is not stored in the in-memory cache;

determining whether a quota to execute parallel threads for input/output operations is exceeded;

in response to determining that the quota is not exceeded, reducing a count of current parallel threads for input/output operations by one; and obtaining, by the in-memory cache, the file from the file system;

in response to obtaining the file from the file system, notifying a thread that is in process at a cache manager of the in-memory cache and is associated with another request for reading the file; and providing the file as read in response to the other request associated with the notified thread.

10. The non-transitory, computer-readable medium of claim 9, wherein the medium further stores instructions which when executed by the one or more processors, cause the one or more processors to perform operations comprising:

receiving a request to upload a file through the file service at the file system;

requesting, by the cache manager of the in-memory cache, to upload the file into the file system; and in response to receiving a notification for a successful upload of the file, providing a response to the request for the successful upload.

11. The non-transitory, computer-readable medium of claim 10, wherein prior to requesting to upload the file in the file system, wherein the medium further stores instructions which when executed by the one or more processors, cause the one or more processors to perform operations comprising:

obtaining, by the cache manager and from a file cache of the in-memory cache, the file and marking the file entry in a status modified.

12. The non-transitory, computer-readable medium of claim 11, wherein in response to receiving the notification for the successful upload of the file, updating the file entry with data of the file to be uploaded.

13. The non-transitory, computer-readable medium of claim 12, wherein the updating of the file entry with data is performed in file data chunks until all the data of the file is stored in the file cache, and wherein in response to uploading the file into the file cache, wherein the medium further stores instructions which when executed by the one or more processors, cause the one or more processors to perform operations comprising:

updating the status of the file entry to a status completed.

14. The non-transitory, computer-readable medium of claim 13, the operations further comprise:

evaluating the file entry for the file in the in-memory cache, the evaluating comprising:

determining that the file is currently updated in the in-memory cache;

updating the file entry to identify that the file is in an updating state; and requesting to read the file from the file system.

15. A system for managing an in-memory cache in a file service, the system comprising a computing device; and a computer-readable storage device coupled to the computing device and having instructions stored thereon which, when executed by the computing device, cause the computing device to perform operations, the operations comprising:

receiving a request, by the in-memory cache, to read a file from a file system of the file service;

in response to the received request, determining that binary data of the file is not stored in the in-memory cache;

determining whether a quota to execute parallel threads for input/output operations is exceeded;

in response to determining that the quota is not exceeded, reducing a count of current parallel threads for input/output operations by one; and obtaining, by the in-memory cache, the file from the file system;

in response to obtaining the file from the file system, notifying a thread that is in process at a cache manager of the in-memory cache and is associated with another request for reading the file; and providing the file as read in response to the other request associated with the notified thread.

16. The system of claim 15, wherein the computer-readable storage device further stores instructions which when executed by the computing device, cause the computing device to perform operations comprising:

receiving a request to upload a file through the file service at the file system;

requesting, by the cache manager of the in-memory cache, to upload the file into the file system; and in response to receiving a notification for a successful upload of the file, providing a response to the request for the successful upload.

17. The system of claim 16, wherein prior to requesting to upload the file in the file system, the operations further comprise:

obtaining, by the cache manager and from a file cache of the in-memory cache, the file and marking the file entry in a status modified.

18. The system of claim 17, wherein in response to receiving the notification for the successful upload of the file, updating the file entry with data of the file to be uploaded.

19. The system of claim 18, wherein the updating of the file entry with data is performed in file data chunks until all the data of the file is stored in the file cache, and wherein in response to uploading the file into the file cache, the operations further comprise updating the status of the file entry to a status completed.

20. The system of claim 19, wherein the operations further comprise: evaluating the file entry for the file in the in-memory cache, the evaluating comprising:

determining that the file is currently updated in the in-memory cache;

updating the file entry to identify that the file is in an updating state; and requesting to read the file from the file system.

\* \* \* \* \*